United States Patent [19]

Bentin et al.

[11] Patent Number: 4,574,445

[45] Date of Patent: Mar. 11, 1986

[54] METHOD AND APPARATUS FOR MANUFACTURING A NOZZLE PLATE FOR INK-JET PRINTERS

[75] Inventors: Horst Bentin; Michael Döring; Horst Kronenberg, all of Hamburg; Werner Jeglinski, Bönningstedt, all of Fed. Rep. of Germany

[73] Assignee: U.S. Philips Corporation, New York, N.Y.

[21] Appl. No.: 633,745

[22] Filed: Jul. 23, 1984

[30] Foreign Application Priority Data

Jul. 23, 1983 [DE]  Fed. Rep. of Germany ....... 3326580

[51] Int. Cl.[4] .................... B21D 53/00; B21D 31/02; B23P 17/02
[52] U.S. Cl. .................................. 29/157 C; 29/424; 29/432; 72/325; 72/465; 83/31; 83/658; 148/403; 222/575
[58] Field of Search ............... 29/157 C, 423, 424, 29/432; 72/325, 465; 83/31, 83, 658; 148/403; 222/566, 575; 346/75

[56]  References Cited

U.S. PATENT DOCUMENTS

| 2,438,837 | 3/1948 | Archer et al. | 72/465 X |
| 2,781,849 | 2/1957 | Bladergroen et al. | 72/465 X |
| 3,978,705 | 9/1976 | Pearce et al. | 72/325 |
| 3,986,379 | 10/1976 | Mansell | 72/465 X |
| 4,425,777 | 1/1984 | Jeglinski | 29/157 C X |
| 4,430,784 | 2/1984 | Brooks et al. | 29/157 C |
| 4,494,393 | 1/1985 | Bruce | 72/465 X |

OTHER PUBLICATIONS

Dictionary of Scientific and Technical Terms; McGraw-Hill Book Company; Second Edition; p. 1020; "microcrystalline".

Primary Examiner—Howard N. Goldberg
Assistant Examiner—Ronald S. Wallace
Attorney, Agent, or Firm—David R. Treacy

[57]  ABSTRACT

Nozzles are formed in a plate for an ink-jet printer by holding a metal foil tightly against the side of the plate from which the nozzle is to protrude, and then pressing and punching through the plate and the metal foil together, through an aperture of a pressing die into a cushion of a hard elastic material such as lead. The foil is made of an isotropic material which is harder than that of the nozzle plate, and is preferably an amorphous or microcrystalline metal.

10 Claims, 3 Drawing Figures

METHOD AND APPARATUS FOR MANUFACTURING A NOZZLE PLATE FOR INK-JET PRINTERS

BACKGROUND OF THE INVENTION

The invention relates to a method of manufacturing a nozzle plate for an ink-jet printer and more particularly to a method including a single operation in which a plate is first pressed locally into a circular aperture in a pressing die by a pressing and punching tool whose dimensions correspond to the internal dimensions of a nozzle to be formed, and the plate is subsequently punched during further pressing to form the nozzle, using an elastic block as a cushion forming the press mold.

The invention also relates to an apparatus for performing the method.

The method itself as well as the apparatus are known from German Offenlegungsschrift 30 42 483, to which U.S. Pat. No. 4,425,777 corresponds. It has been found that in nozzle plates thus manufactured the quality of the nozzle edges at the exit end depends to a comparatively high degree on the surface structure of the nozzle plate material. For example, during the punching of the plates the nozzle edges thus formed are torned off irregularly, which is inter alia due to excessive expansion of the material of the nozzle plate, thus giving rise to asymmetrical or rough nozzle edges.

SUMMARY OF THE INVENTION

The object of the invention is to manufacture nozzle plates for ink-jet printers, having edges which are smoother than those of known nozzles.

According the invention this object is achieved by positioning a metal foil tightly against that side of the plate which is remote from the tool, and pressing and punching the foil through the circular aperture together with the plate. The metal foil is made of a material which is harder than that of the nozzle plate and does not have a preferred mechanical orientation that is, an isotropic material.

After the punching operation, the remainder of the metal foil thus acts as a kind of additional die which provides a symmetrical shape of the nozzle edge and at the same time provides an increased material density, resulting in smoother nozzle edges.

Preferably, an apparatus for performing the method comprises a pressing and punching tool and a cushion which receives the tool and which carries a pressing die with a circular aperture for the formation of a nozzle, the metal foil overlying the pressing die so that it covers the circular aperture and can be fixed tightly between the pressing die and the plate in which a nozzle is to be formed.

Thus, for the formation of the ink-jet nozzles the nozzle plate to be formed can be arranged directly on the metal foil. Before the pressing and punching a holddown device which is connected to the pressing and punching tool presses both the plate and the metal foil underneath it against the pressing die and the cushion, respectively, so that the metal foil is tightened firmly between the pressing die and the plate.

Preferably, the isotropic metal foil consists either of an amorphous material, for example amorphous iron, or of a micro crystalline material of very small grain size, for example electroformed chromium. The thickness of the metal foil preferably amounts to from approximately 20 to 25 $\mu$m.

Such metal foils of amorphous or micro crystalline material which does not have a preferred mechanical orientation, for example rolling direction or the like, is most suitable for the precise separation of the part formed (blank) from the remainder of the material, and hence for the manufacture of high-precision nozzles with accurately defined and smooth edges.

The invention will be described in more detail, by way of example, with reference to the drawings.

DESCRIPTION OF THE PREFERRED EMBODIMENT

Figure 1:
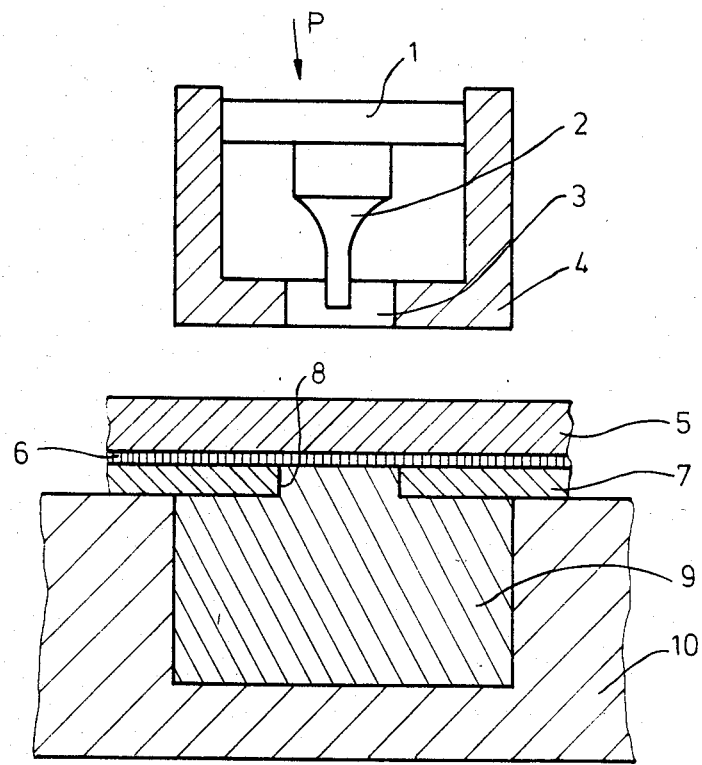
FIG. 1 is a sectional elevation of an apparatus for performing the method in accordance with the invention.

A press plate 1 which carries a pressing and punching tool 2 is arranged so as to be slidable in a hold-down device 4. When a pressure P is exerted on the press plate 1, the hold-down device 4 is moved in the direction indicated by the arrow P until the lower side of the hold-down device 4 bears on the plate 5 in which the nozzle is to be formed. When the pressure is increased, the tool 2 passes through an opening 3 in the hold-down device 4.

On that side of the plate 5 which is remote from the tool 2 a metal foil 6 is positioned against the plate 5. The metal foil 6 overlies a pressing die 7 which has a circular aperture 8 for the formation of the desired nozzles. The pressing die 7 itself bears on a hard elastic block or cushion 9 which is arranged in a recess in an anvil 10 which is preferably made of steel or cast iron. The cushion 9 is made of lead or another suitable material having similar mechanical properties.

The cushion 9 may be constructed, for example, so that a part thereof projects through the circular aperture 8 and is in direct contact with the lower surface of the metal foil 6. The cushion 9 may further be arranged in the anvil 10 in such a way that after termination of each punching operation, it can be displaced together with the metal foil 6 and the pressing die 7, for example, perpendicularly to the plane of drawing of FIG. 1, so that subsequently an unused portion of the metal foil 6 and the cushion 9 will be situated opposite the tool 2. This requires a displacement over a distance equal to the distance between two adjacent circular apertures 8 in the pressing die 7.

If the cushion 9 does not project into a circular aperture 8, only the metal foil 6 and the cushion 9 need be displaced after each punching operation.

The shape of the tool 2 corresponds to the desired shape of the nozzle. The tool has a smoothly polished surface of homogeneous hardness. The homogeneous hardness can be obtained, for example, by means of a salt bath. In the present embodiment the leading part of the tool 2 has a diameter of 50 $\mu$m which increases to 300 $\mu$m at the opposite side.

The plate 5 consists of pure nickel which has been subjected to soft annealing in order to reduce its hardness. The nickel plate 5 has been polished on the side facing the metal foil 6. It has a thickness of approximately 300 μm.

The metal foil 6 has a thickness of from 20 to 25 μm and is made of a material which is much harder than the material of the plate 5. For example, the metal foil 6 may consist of amorphous iron having a vickers hardness of from 800 to 1000 $VH_{02}$. However, the metal foil 6 may alternatively consist of a micro-crystalline material, for example electroformed chromium. Materials of this type are isotropic; that is they do not have a preferred mechanical orientation, for example a rolling direction or the like, so that the blank can be separated with a very sharp and smooth edge and smooth nozzles edges can be formed. It will be apparent that, for example, silicon and borium may be added to the amorphous iron foil 6 to increase its hardness, so that even more accurate nozzle edges can be formed.

The pressing die 7 which is arranged underneath the metal foil 6 is made of steel and has a thickness of the order of magnitude of that of the plate 5.

Figure 2:
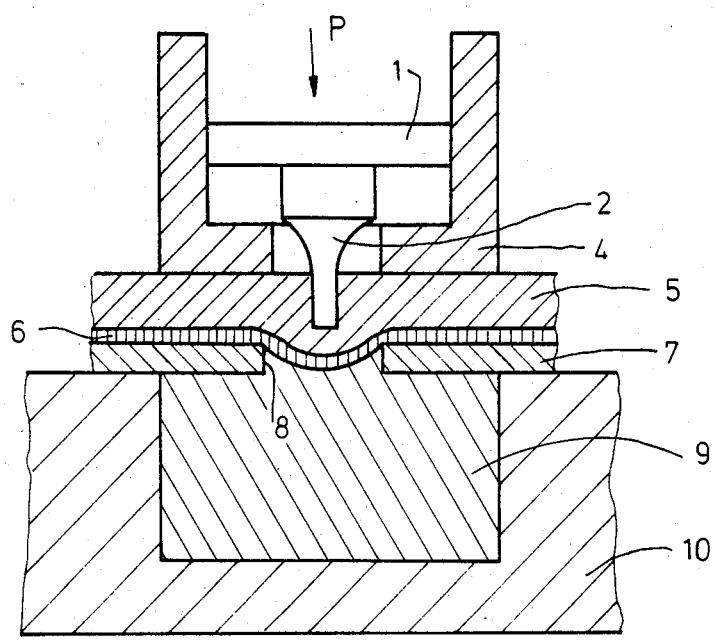
FIG. 2 is a similar view of the apparatus of FIG. 1 during the pressing operation.
Figure 3:
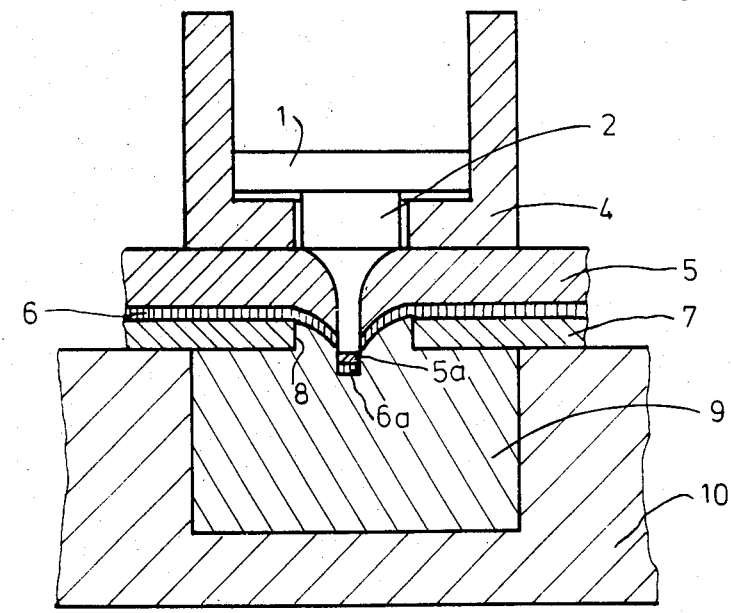
FIG. 3 shows the apparatus of FIG. 1 after the punching operation.

FIG. 1 shows the situation prior to the pressing and punching operation and FIG. 2 illustrates the pressing operation. The leading part of the tool 2 has penetrated into the plate 5 and has pressed part of the plate 5 and the metal foil 6 into the die aperture 8 and into the cushion 9. When the pressure P on the tool 2 is sustained, the actual punching operation commences, the part of the plate 5 and the metal foil 6 being further stretched in front of the tool 2. The blanks 5a, 6a formed from the plate 5 and the metal foil 6 are pressed into the cushion 9 by the force exerted on the tool 2. After the punching operation and after the return of the tool 2 and the hold-down device 4, the cushion 9, together with the blanks 5a, 6a, is so positioned in the anvil 10 that subsequently the tool 2 faces unused parts of the metal foil 6 and the cushion 9. Ink-jet nozzles manufactured by this pressing punching operation are very accurate and have acute, smooth edges, which provide symmetrical wetting.

When a plurality of nozzles are to be formed in the plate 5, the relevant pressing and punching tool may be laterally displaced after each pressing and punching operation. However, it is alternatively possible to arrange a plurality of simultaneously operated tools adjacent each other. In that case a displacement of the tools is not necessary, because the relevant nozzle orifices are then formed simultaneously instead of successively.

What is claimed is:

1. A method of manufacturing a nozzle plate for an ink-jet printer, including
    aligning a pressing and punching tool having dimensions corresponding to the internal dimensions of a nozzle to be formed, opposite a pressing die having a circular aperture and a press mold formed by a cushion which is an elastic block, and
    in a single operation, using the tool to locally press the plate into the circular aperture, and then punching through the plate into the elastic block during further pressing of the tool,
    wherein the improvement comprises the steps of providing a metal foil made of an isotropic material which is harder than said plate,
    positioning the metal foil tightly against that side of the plate which is remote from the tool,
    pressing and punching the foil through the circular aperture together with the plate during said single operation.

2. A method as claimed in claim 1, characterized in that said providing step includes providing a metal foil consisting of an amorphous metal.

3. A method as claimed in claim 2, characterized in that said amorphous metal is iron.

4. A method as claimed in claim 1, characterized in that said providing step includes providing a metal foil consisting of an microcrystalline metal.

5. A method as claimed in claim 4, characterized in that said amorphous metal is electroformed chromium.

6. A method as claimed in any one of claims 1-5, characterized in that the metal foil is selected to have a thickness between approximately 1/15 and 1/12 that of the nozzle plate.

7. A method as claimed in claim 6, characterized in that said elastic block is made of lead.

8. A method as claimed in any one of claims 1-5, characterized in that the metal foil is selected to have a thickness of from approximately 20-25 μm.

9. A method as claimed in claim 8, characterized in that said elastic block is made of lead.

10. A method as claimed in claim 1, characterized by the subsequent step of displacing at least the metal foil and the elastic block together in a direction perpendicular to the direction of relative movement during the pressing and punching steps.

* * * * *